(12) United States Patent
Firebaugh et al.

(10) Patent No.: US 7,735,019 B2
(45) Date of Patent: Jun. 8, 2010

(54) METHOD FOR PROVIDING FUNCTIONAL CONTEXT WITHIN AN ACTIVELY SCROLLING VIEW PANE

(75) Inventors: Joseph Eric Firebaugh, Corinth, TX (US); Santiago D. Oretega, Raleigh, NC (US); Ryan Alexander Boyles, Wake Forest, NC (US); Laquicia Shianna Barbee, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 11/739,769

(22) Filed: Apr. 25, 2007

(65) Prior Publication Data

US 2008/0270934 A1 Oct. 30, 2008

(51) Int. Cl.
*G06F 3/00* (2006.01)
(52) U.S. Cl. .................... 715/784; 715/708; 715/781
(58) Field of Classification Search ................. 715/705, 715/708, 781, 784, 821
See application file for complete search history.

(56) References Cited

U.S. PATENT DOCUMENTS

| | | | | |
|---|---|---|---|---|
| 5,140,677 A | 8/1992 | Fleming et al. | ............. | 395/159 |
| 5,793,369 A | 8/1998 | Atkins et al. | ................ | 345/339 |
| 6,044,217 A | 3/2000 | Brealey et al. | .............. | 395/701 |
| 6,536,035 B1 | 3/2003 | Hawkins | ...................... | 717/100 |
| 6,564,200 B1 | 5/2003 | Perkins et al. | .................. | 707/1 |
| 6,715,109 B1 | 3/2004 | Charlet et al. | .................. | 714/38 |
| 6,792,595 B1 | 9/2004 | Storistenau et al. | ......... | 717/110 |
| 6,816,174 B2 * | 11/2004 | Wu et al. | ..................... | 715/787 |
| 7,065,717 B1 | 6/2006 | Perkins et al. | .............. | 715/854 |
| 7,110,991 B2 | 9/2006 | Arnold et al. | ................... | 707/2 |
| 2002/0186251 A1* | 12/2002 | Himmel et al. | ............. | 345/784 |
| 2005/0097601 A1* | 5/2005 | Danker et al. | ................. | 725/39 |
| 2005/0210403 A1 | 9/2005 | Satanek | ...................... | 715/786 |
| 2005/0257166 A1 | 11/2005 | Tu | ............................ | 715/787 |
| 2006/0184901 A1 | 8/2006 | Dietz | ......................... | 715/855 |
| 2006/0242599 A1* | 10/2006 | Choo et al. | ................. | 715/821 |
| 2007/0294635 A1* | 12/2007 | Craddock et al. | ........... | 715/784 |
| 2008/0134080 A1* | 6/2008 | Moore et al. | ................ | 715/786 |
| 2008/0141025 A1* | 6/2008 | Noble | ......................... | 713/155 |

OTHER PUBLICATIONS

Cockburn, Andy and Smith, Matthew "Hidden Messages: Evaluating the Efficiency of Code Elision in Program Navigation", published Jun. 2003, in Interacting with Computers (Journal), vol. 15, No. 3, pp. 387-407, by Elsevier in the United Kingdom, Feb. 20, 2003 (26 pages).

* cited by examiner

*Primary Examiner*—X. L Bautista
(74) *Attorney, Agent, or Firm*—Hamilton & Terrile, LLP; Stephen A. Terrile

(57) ABSTRACT

A method, system and computer-usable medium for using a context aware viewport module to graphically display, and interact with, a viewport. The context aware viewport is implemented in a graphical user interface (GUI) and comprises a spatially context aware informational portion and a viewport portion.

20 Claims, 6 Drawing Sheets

```
if (cleanUpPerformed)
    return;

cleanUpPerformed = true;

//remove all from this
removeall();
// First, if we have a CPanelHandler registered v
// to perform cleanup.  Then we clean up our ow
if (classHandler != null)
    classHandler.cleanup();

if (components != null)
{
    components.clear();
    components = null
} if(fieldNumberReference != null)
{
    fieldNumberReference.clear();
    fieldNumberReference = null;
}
```

*Figure 1 (Prior Art)*

```
public Object getLayoutComponent()

*/                                                    }- 540
public Adapter getSelectedAdapter()
{
        Component currComp = tabbedPane.getSelectedComponent();

Adapter adapter = null;

if ( currComp ! = null )
        {
                adapter = this.getAdapter( currComp );
        )

return adapter;
)
/**
* adds the component associated with the specified adapter to the
JTabbedPane using
* any associated layout constraints as a tab index.
*/
public /* was protected */ void addComponent ( Adapter adapter )
{
        Function rasl = null;
        if (FW_Globals.IS_TRACING)
                rasl = unit.entry( entryOf.Pyblic, "addComponent(Adapter)");

// Capture a reference to the first adapter added
        if (initialAdapter == null)
        initialAdapter = (PresentationAdapter)adapter;

// Attempt to retrieve resource group from adapter being added ...
        ResourceGroup resGroup = adapter.getResourceGroup ();

// Have we already allocated the toll bar adapter array?
        if (toolBars == null)
        toolBars = new HashMap (new IdenticalTo() );

//See if the component has a tool bar
        ToolBarAdapter toolBar = null;
        if (adapter instanceof PresentationAdapter)
        toolBar = ((PresentationAdapter)adapter).builtToolBar(this);

if (toolbar != null)
                toolBars.add( adapter, toolBar );

//Favor NAME property over resource group, if supplied ...
        String adapterName = NamedAttributeHelper.getNAME( adapter );
        if ((adapterName == null) || (adapterName.length() == 0))
```

*Figure 5*

METHOD FOR PROVIDING FUNCTIONAL CONTEXT WITHIN AN ACTIVELY SCROLLING VIEW PANE

BACKGROUND OF THE INVENTION

1. Field of the Invention

The present invention relates in general to the field of computers and similar technologies, and in particular to software utilized in this field. Still more particularly, the present invention relates to providing functional context within an actively scrolling view pane.

2. Description of the Related Art

When viewing or editing documents that have functional sections or titled data, it is sometimes possible to be viewing a portion of the document and not be able to tell what section or function is being viewed. For example, FIG. 1, labeled Prior Art, shows a viewport with source code visible. The method that is being viewed is longer in content than the length of the viewport. Therefore, while scrolling the viewport, a user does not always have knowledge of the title or name of the section being viewed.

Known integrated developer environments (IDEs) have attempted to address this issue by highlighting the method name being viewed in a hierarchical outline. However, the highlighting of the method is based on the location of the editing cursor. Accordingly, it is possible to select some text within a method, or actuate the cursor to a position within a method, and scroll the viewport away from that method. This action can cause the highlight to be misleading regarding which section or function is located within the code as compared with a section being viewed. For example, FIG. 1 shows a line selected. If an outline view shows that the method createView( ) is being edited and the view is scrolled to a new area within the code, the outline will not provide information regarding to where the view has been scrolled.

SUMMARY OF THE INVENTION

In accordance with the present invention, a method, system and computer-usable medium for using a context aware viewport module to graphically display, and interact with, a viewport is provided. In various embodiments of the invention, a context aware viewport is implemented in a graphical user interface (GUI) and comprises an informational portion and a viewport portion.

More specifically, in one embodiment, the invention relates to a computer-implementable method comprising presenting a graphical user interface, the graphical user interface including a viewport portion and an informational portion; determining whether the viewport has been scrolled; and, presenting context aware information within the informational portion when the viewport portion is scrolled.

In another embodiment, the invention relates to a system comprising a processor; a data bus coupled to the processor; and a computer-usable medium embodying computer program code, the computer-usable medium being coupled to the data bus. The computer program code comprises instructions executable by the processor and configured for: presenting a graphical user interface, the graphical user interface including a viewport portion and an informational portion; determining whether the viewport has been scrolled; and, presenting context aware information within the informational portion when the viewport portion is scrolled.

In another embodiment, the invention relates to a computer-usable medium embodying computer program code. The computer program code comprises computer executable instructions configured for: presenting a graphical user interface, the graphical user interface including a viewport portion and an informational portion; determining whether the viewport has been scrolled; and, presenting context aware information within the informational portion when the viewport portion is scrolled.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 1, labeled Prior Art, shows an example viewport screen presentation

FIG. 5 shows another example of a viewport screen presentation; and

DETAILED DESCRIPTION

Figure 2:
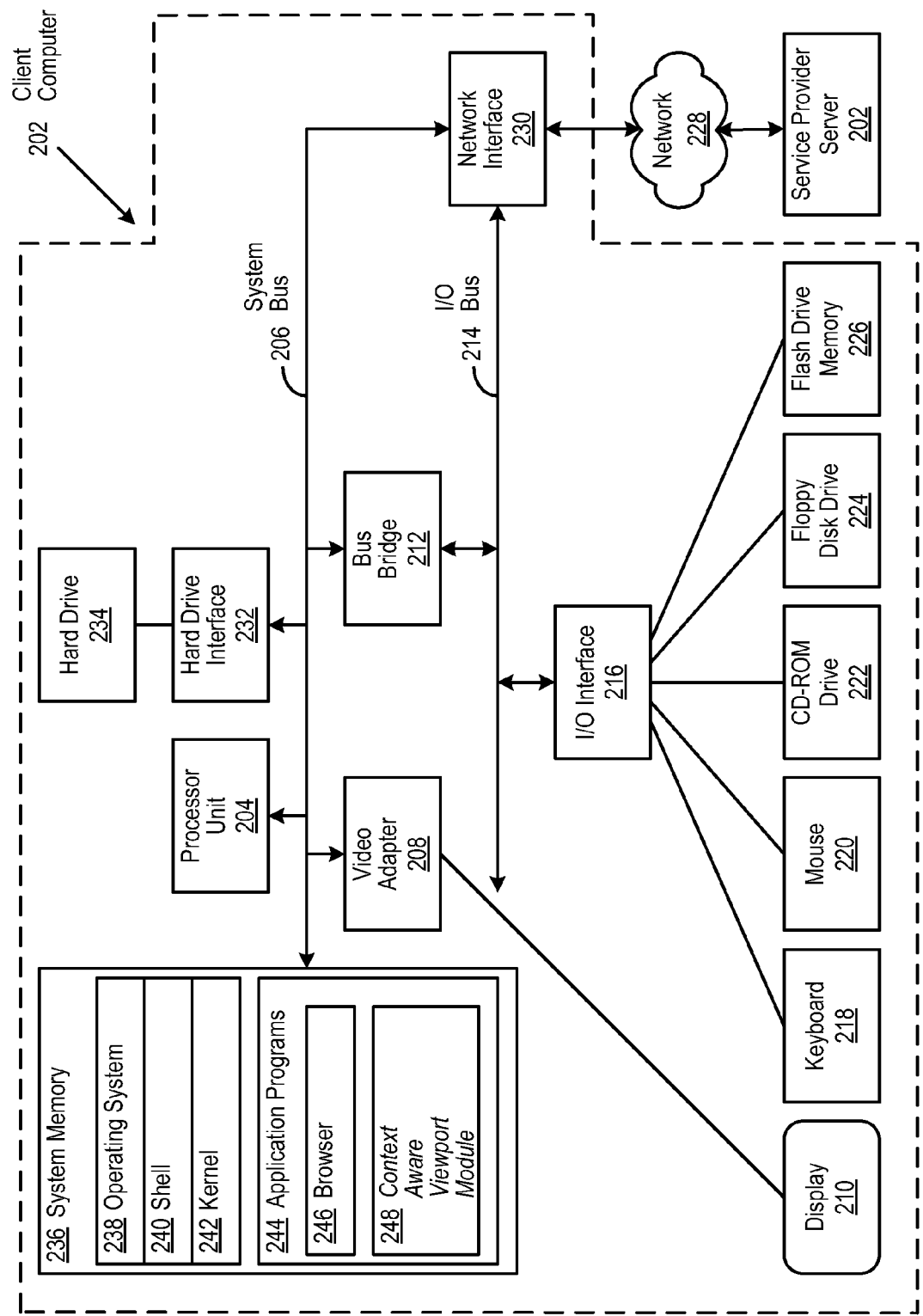
FIG. 2 shows an exemplary computer system in which the present invention may be implemented.

A method, system and computer-usable medium are disclosed for using a context aware viewport module to graphically display, and interact with, a viewport. In various embodiments of the invention, a context aware viewport is implemented in a graphical user interface (GUI) and comprises an informational portion and a viewport portion.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 2 is a block diagram of an exemplary computer 202 in which the present invention may be utilized. Computer 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

Computer 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the computer's 202 operating system (OS) 238 and application programs 244.

OS 238 includes a shell 240 for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and application programs 244, including memory management, process and task management, disk management, and mouse and keyboard management.

Application programs 244 may include a browser 246 and email client 248. Browser 246 includes program modules and instructions enabling a World Wide Web (WWW) client (i.e., computer 202) to send and receive network messages to the Internet using HyperText Transfer Protocol (HTTP) messaging, thus enabling communication with service provider server 252. Application programs 244 also a context aware viewport module 248. The context aware viewport module includes code for implementing the processes described in FIGS. 3-6 described hereinbelow. In one embodiment, computer 202 is able to download the interactive progress bar 250 from a service provider server 252.

The hardware elements depicted in computer 202 are not intended to be exhaustive, but rather are representative to highlight components used by the present invention. For instance, computer 202 may include alternate memory storage devices such as magnetic cassettes, Digital Versatile Disks (DVDs), Bernoulli cartridges, and the like. These and other variations are intended to be within the spirit and scope of the present invention.

Figure 3:
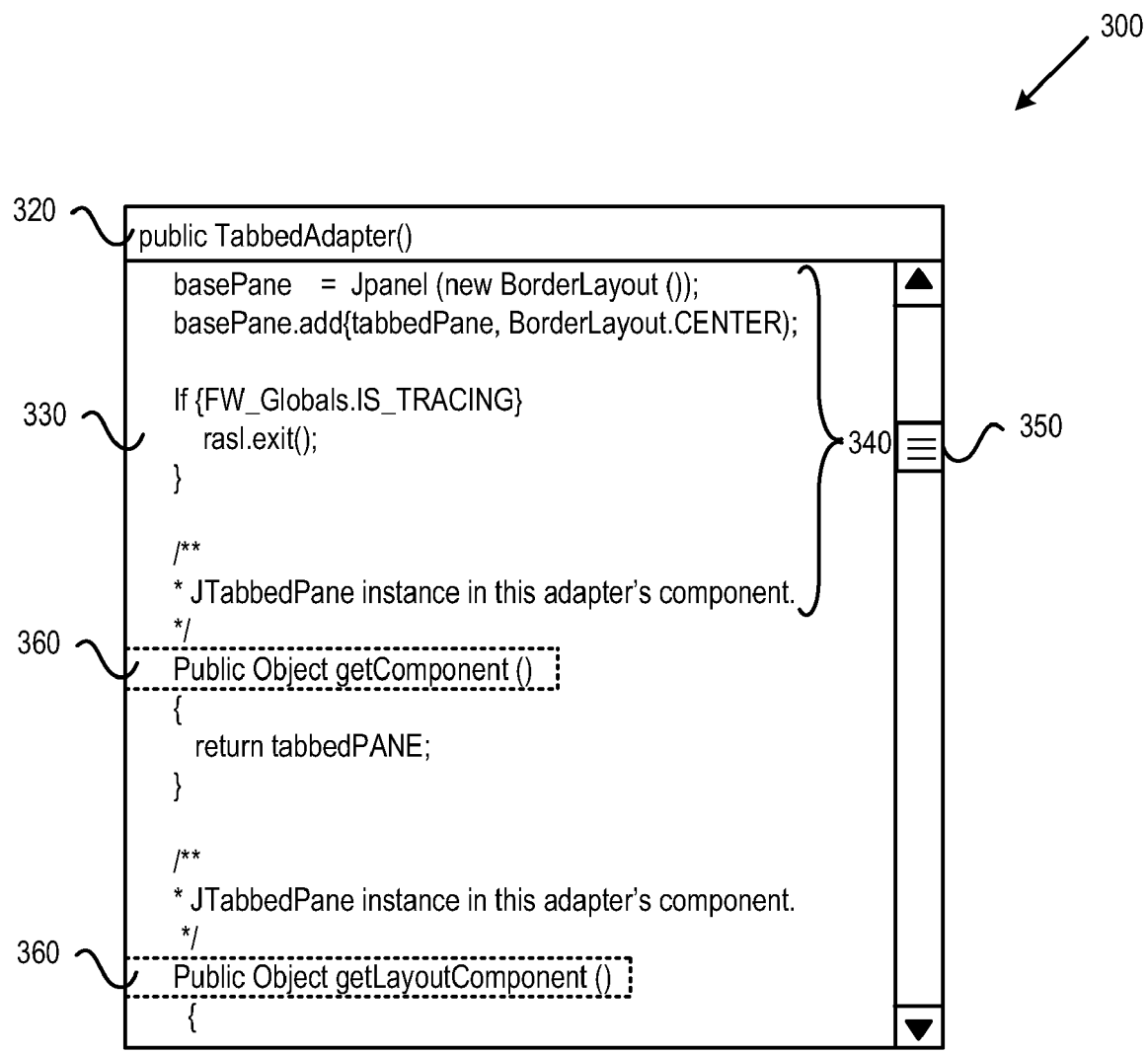
FIG. 3 shows an example viewport screen presentation.

Referring to FIG. 3, an example viewport screen presentation 300 is shown. More specifically, the viewport 300 includes an informational portion 320 positioned above the viewport portion 330. The informational portion 320 provides context aware information (i.e., information regarding the method that is beyond the top of the viewport 330 (e.g., the method 340). The informational portion is constantly updated while the viewport is scrolling (e.g., by dragging the scroll bar 350). Scrolling of the viewport causes information presented within the viewport portion 330 to change, often in a sequential manner. However, it is also possible to actuate the scroll portion at a different location and cause the scroll bar 350 to move directly to the actuated location. The information presented within the viewport portion 330 corresponds to the location of the scroll bar 350, The information portion 320 provides a direct reflection of what information is being displayed within the viewport 330 as compared with the location of a cursor (not shown).

In the example viewport screen presentation 300, the Java Constructor TabbedAdapter( ) is not entirely visible within the viewport 330. The informational portion 320 presents the name of the constructor. The highlighted lines 360 indicate other methods that are visible within the viewport. The context aware viewport module 248 highlights these additional methods to distinguish between the beginning and the end of a functional area.

Figure 4:
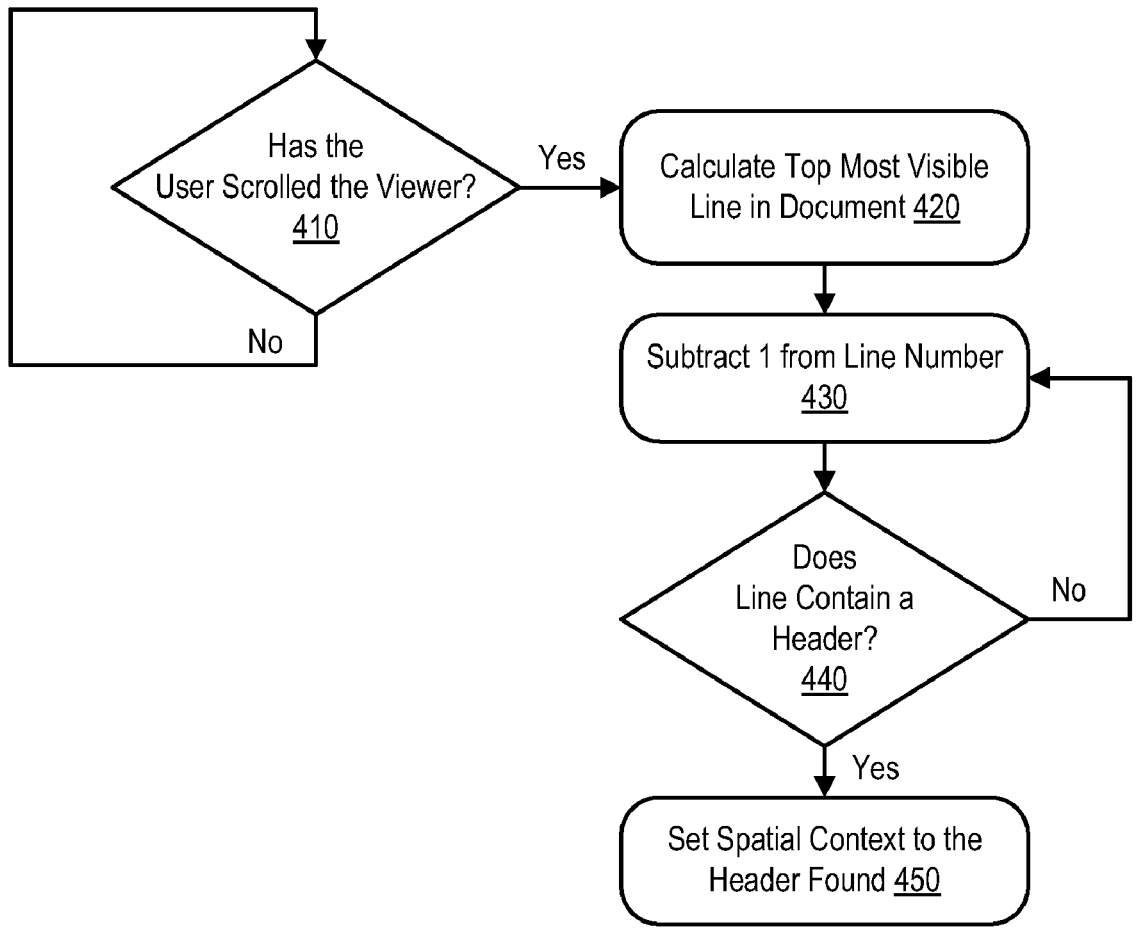
FIG. 4 shows a flow chart of the operation of a context aware viewport module.

Referring to FIG. 4, a flow chart of the operation of a context aware viewport module 248 is shown. The context aware viewport module 248 monitors a program that is presenting a viewport to determine whether a user has scrolled the viewer at step 410. When the view is scrolled, the context aware viewport module 248 calculates a top most visible line of a document being presented within the viewport at step 420. Next the context aware viewport module 248 subtracts 1 from the line number at step 430. Next the context aware viewport module 248 determines whether the new line number contains a header (such as a method header) at step 440. If the new line number does not contain a header, then the context aware viewport module 248 again subtracts 1 from the line number at step 430.

If the new line number does contain a header, then the context aware viewport module 248 sets a spatial context variable to the identified header at step 450. The spatial context variable is used by the context aware viewport module 248 to present the informational portion 320 associated with the viewport 330.

In certain embodiments, the context aware viewport module 248 uses the ability of the Java Swing JEditorPane to query what line is beneath any given screen coordinate. A scroll listener is attached to the viewport so that the context aware viewport module 248 is notified of all scrolling events within the editor. When scrolling is detected Java Swing is asked what line number is below (01,01) of the JEditorPane. From that line, the document is traversed backward looking for the first instance of a Titled Section (such as a Java method name). When found, the title is displayed within the informational portion. Thus, the informational portion 320 is updated in real time as a user scrolls through the document. In certain embodiments, if a titled section is not found the informational portion 320 can display the document name or file name.

FIG. 5 shows another example of a viewport screen presentation 500. The informational portion 320 continues to present context aware information until the viewport is scrolled to a new context. Accordingly, the informational portion 320 shows that the context of the viewport 330 corresponds to public Object getLayoutComponent( ). All that is left of the context public Object getLayoutComponent( ) is the closing statement */540. If the viewport were scrolled an additional two lines, the information portion 320 would change to show that the context of the viewport 330 corresponds to the context public Adapter getSelectedAdapter( ).

Figure 6:
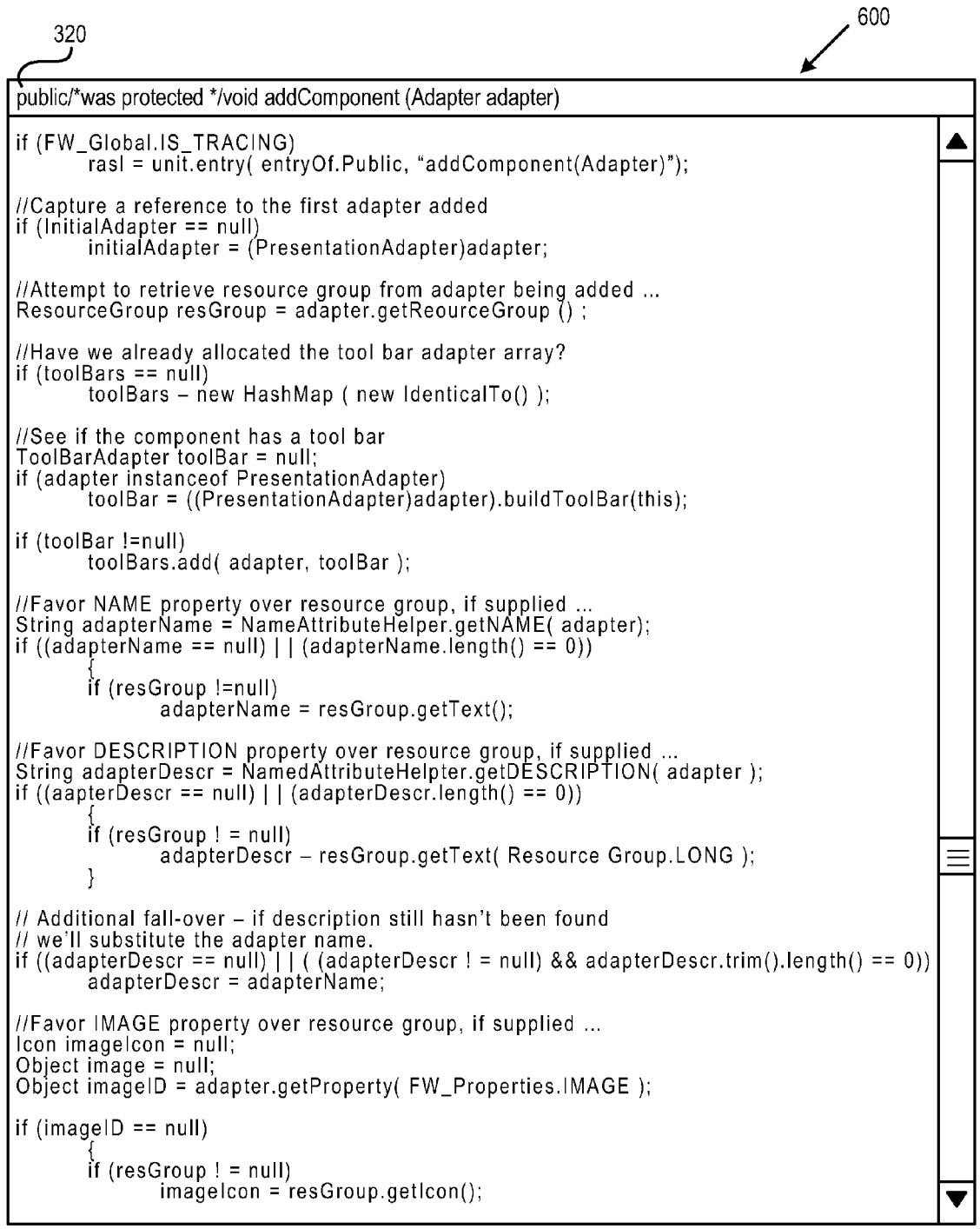
FIG. 6 shows another example of a viewport screen presentation.

FIG. 6 shows another example of a viewport screen presentation 600. With longer contexts, it is possible that no additional context information is visible within the viewport 330. Accordingly, if the viewport 330 were scrolled to such a context, the user is still able to have context aware information regarding the context of the viewport via the informational portion 320. For example with the viewport screen presentation 600, the context of the viewport corresponds to public /*was protected */void addComponent (Adapter adapter).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method comprising:
   presenting a graphical user interface, the graphical user interface including a viewport portion and an informational portion;
   determining whether the viewport has been scrolled;
   presenting context aware information within the informational portion when the viewport portion is scrolled; and,
   querying what line is beneath a particular viewport coordinate; and wherein,
   the presenting content aware information further comprises presenting information regarding what line is beneath the particular viewport coordinate.

2. The computer-implementable method of claim 1, further comprising:
   using a position awareness function to provide the context aware information.

3. The computer-implementable method of claim 1, wherein the querying further comprises:
   using a Java Swing JEditorPane to query what line is beneath the particular viewport coordinate.

4. The computer-implementable method of claim 1, further comprising:
   highlighting portions of information within the viewport to distinguish between the different functional areas.

5. The computer-implementable method of claim 4, wherein the presenting content aware information further comprises:
   determining a line number associated with the top most visible line of the document; and,
   subtracting one from the line number to provide a new line number of an adjacent line of the document to identify the line adjacent to the top most visible line.

6. The computer-implementable method of claim 1, wherein the presenting content aware information further comprises:
   identifying a top most visible line of a document presented within the viewport; and,
   determining whether a line adjacent to the top most visible line contains a header; and,
   presenting the header.

7. A system comprising:
   a processor;
   a data bus coupled to the processor; and
   computer program product embodying computer program instructions, the computer program product being coupled to the data bus, the computer program instructions being executable by the processor and configured for:
      presenting a graphical user interface, the graphical user interface including a viewport portion and an informational portion;
      determining whether the viewport has been scrolled; and,
      presenting context aware information within the informational portion when the viewport portion is scrolled; and,
      querying what line is beneath a particular viewport coordinate; and wherein,
      the presenting content aware information further comprises presenting information regarding what line is beneath the particular viewport coordinate.

8. The system of claim 7, wherein the instructions are further configured for:
   using a position awareness function to provide the context aware information.

9. The system of claim 7, wherein the instructions for querying are further configured for:
   using a Java Swing JEditorPane to query what line is beneath the particular viewport coordinate.

10. The system of claim 7, wherein the instructions are further configured for:
    highlighting portions of information within the viewport to distinguish between the different functional areas.

11. The system of claim 7, wherein the instructions for presenting content aware information are further configured for:
    identifying a top most visible line of a document presented within the viewport; and,
    determining whether a line adjacent to the top most visible line contains a header; and,
    presenting the header.

12. The system of claim 11, wherein the instructions for presenting content aware information are further configured for:
    determining a line number associated with the top most visible line of the document; and,
    subtracting one from the line number to provide a new line number of an adjacent line of the document to identify the line adjacent to the top most visible line.

13. A computer program product embodying computer program instructions, the computer program instructions comprising computer executable instructions configured for:
    presenting a graphical user interface, the graphical user interface including a viewport portion and an informational portion;
    determining whether the viewport has been scrolled; and,
    presenting context aware information within the informational portion when the viewport portion is scrolled; and,
    querying what line is beneath a particular viewport coordinate; and wherein,
    the presenting content aware information further comprises presenting information regarding what line is beneath the particular viewport coordinate.

14. The computer program product of claim 13, wherein the embodied computer program instructions further comprises computer executable instructions configured for:
    using a position awareness function to provide the context aware information.

15. The computer program product of claim 13, wherein the embodied computer program instructions for querying further comprises computer executable instructions configured for:
    using a Java Swing JEditorPane to query what line is beneath the particular viewport coordinate.

16. The computer program product of claim 13, wherein the embodied computer program instructions further comprises computer executable instructions configured for:
    highlighting portions of information within the viewport to distinguish between the different functional areas.

17. The computer program product of claim 13, wherein the embodied computer program instructions for presenting content aware information further comprises computer executable instructions configured for:
    identifying a top most visible line of a document presented within the viewport; and,
    determining whether a line adjacent to the top most visible line contains a header; and,
    presenting the header.

18. The computer program product of claim 13, wherein the embodied computer program instructions for presenting content aware information further comprises computer executable instructions configured for:

determining a line number associated with the top most visible line of the document; and, subtracting one from the line number to provide a new line number of an adjacent line of the document to identify the line adjacent to the top most visible line.

19. The computer program product of claim 13, wherein the computer executable instructions are deployable to a client computer from a server at a remote location.

20. The computer program product of claim 13, wherein the computer executable instructions are provided by a service provider to a customer on an on-demand basis.

\* \* \* \* \*

UNITED STATES PATENT AND TRADEMARK OFFICE
CERTIFICATE OF CORRECTION

PATENT NO. : 7,735,019 B2
APPLICATION NO. : 11/739769
DATED : June 8, 2010
INVENTOR(S) : Joseph Eric Firebaugh et al.

Page 1 of 1

It is certified that error appears in the above-identified patent and that said Letters Patent is hereby corrected as shown below:

On The Title Page, Item (75)

The second inventor's name should read Santiago D. Ortega

Signed and Sealed this
Twenty-first Day of June, 2016

Michelle K. Lee
*Director of the United States Patent and Trademark Office*